(12) United States Patent
Thompson et al.

(10) Patent No.: US 11,725,763 B2
(45) Date of Patent: Aug. 15, 2023

(54) PIPE FITTING WITH INNER AND OUTER SEALS

(71) Applicant: Honeywell International Inc., Morris Plains, NJ (US)

(72) Inventors: Jason Thompson, Langhorne, PA (US); Derrick Sanislo, Thompson, OH (US)

(73) Assignee: Honeywell International Inc., Charlotte, NC (US)

( * ) Notice: Subject to any disclaimer, the term of this patent is extended or adjusted under 35 U.S.C. 154(b) by 180 days.

(21) Appl. No.: 16/690,812

(22) Filed: Nov. 21, 2019

(65) Prior Publication Data

US 2021/0156500 A1   May 27, 2021

(51) Int. Cl.
*F16L 37/092* (2006.01)
*F16L 47/06* (2006.01)

(52) U.S. Cl.
CPC ......... *F16L 37/0925* (2013.01); *F16L 47/065* (2013.01)

(58) Field of Classification Search
CPC .... F16L 37/0925; F16L 37/0926; F16L 47/12
USPC ................. 285/323, 371, 910, 918
See application file for complete search history.

(56) References Cited

U.S. PATENT DOCUMENTS

| | | | | |
|---|---|---|---|---|
| 4,407,526 A * | 10/1983 | Cicenas | ............. | F16L 37/0925 285/323 |
| 6,050,613 A * | 4/2000 | Wartluft | ............. | F16L 37/0925 285/371 |
| 6,142,538 A * | 11/2000 | Volgstadt | ............. | F16L 37/0925 285/323 |
| 6,199,915 B1 * | 3/2001 | Becker | ............. | 285/910 |
| 6,371,531 B1 * | 4/2002 | Robison | ............. | F16L 37/0925 285/323 |
| 6,877,777 B1 * | 4/2005 | Wartluft | ............. | F16L 37/0925 |
| 2012/0080856 A1 * | 4/2012 | Smith | | |
| 2018/0100612 A1 * | 4/2018 | Robison | ............. | F16L 37/0925 |

FOREIGN PATENT DOCUMENTS

WO   WO 2004/063614 A2   7/2004

* cited by examiner

*Primary Examiner* — Zachary T Dragicevich
(74) *Attorney, Agent, or Firm* — Oritz & Lopez, PLLC; Luis M. Ortiz; Kermit D. Lopez

(57) ABSTRACT

A pipe fitting configured to be coupled to a pipe. The pipe fitting includes a body that is elongate along a central axis that extends in a longitudinal direction. The body includes a shell, a stiffener, and a shell-stiffener. The shell includes a shell inner surface that defines a shell through hole that extends through the shell in the longitudinal direction. The stiffener is positioned within the shell through hole, and the stiffener includes a stiffener outer surface that faces the shell inner surface such that the stiffener outer surface and the shell inner surface cooperate to define a pocket configured to receive the pipe. A shell-stiffener seal member is positioned about the stiffener such that a seal member inner surface is substantially flush against the stiffener outer surface and a seal member outer surface abuts against the shell inner surface.

21 Claims, 9 Drawing Sheets

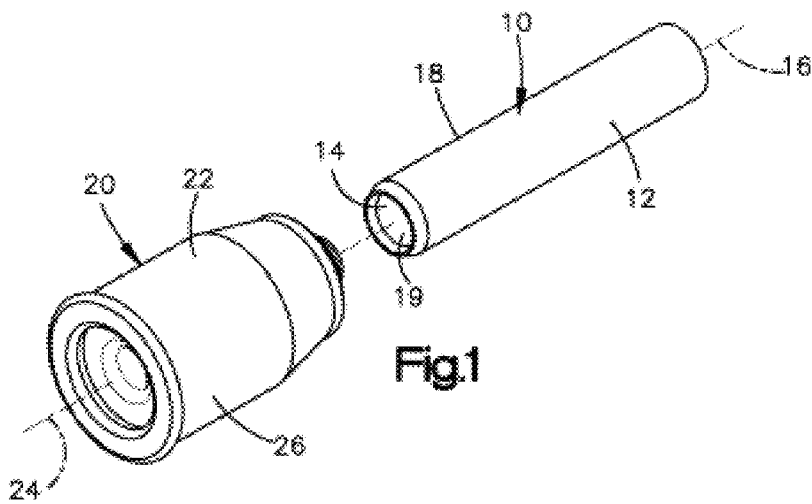
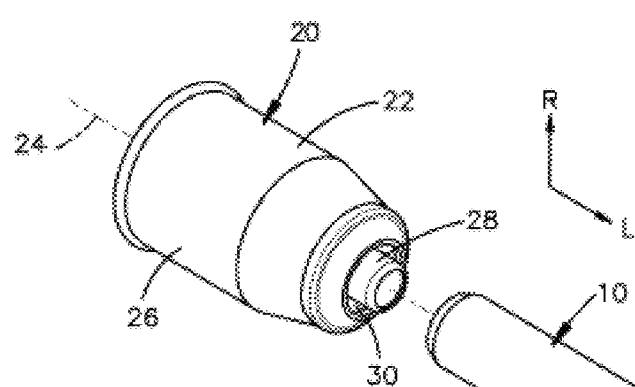
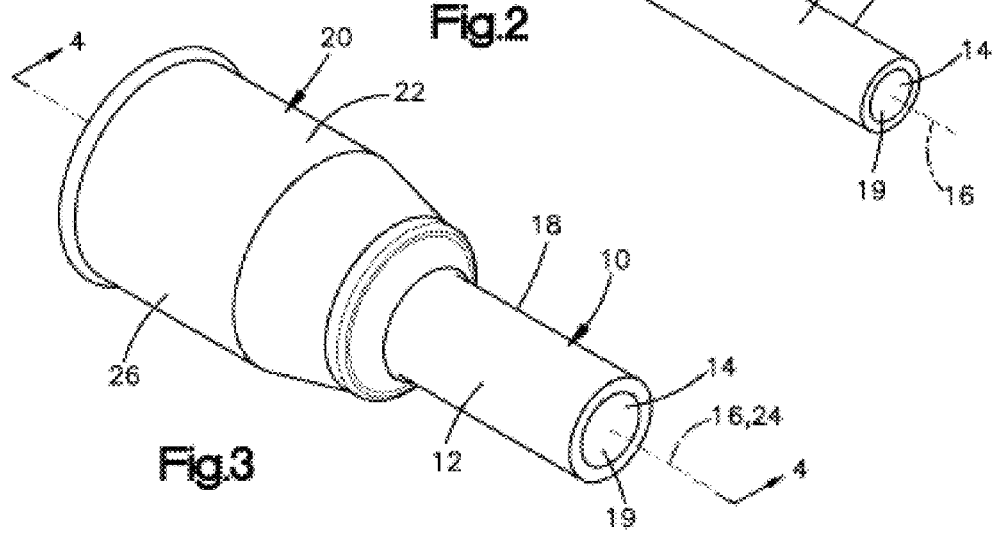

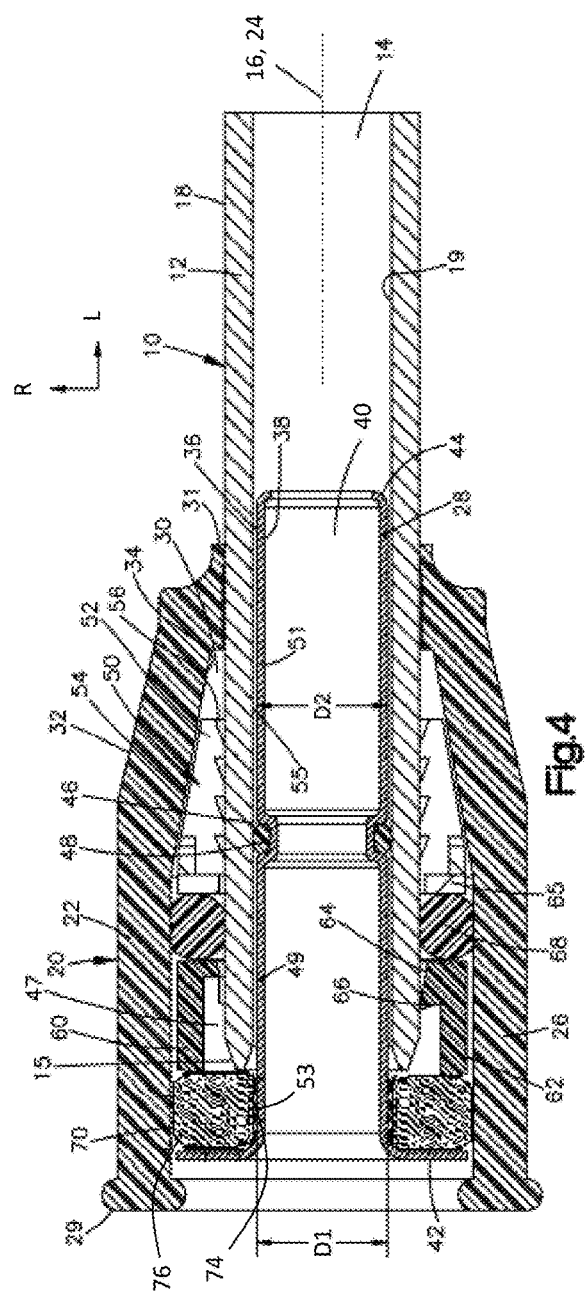

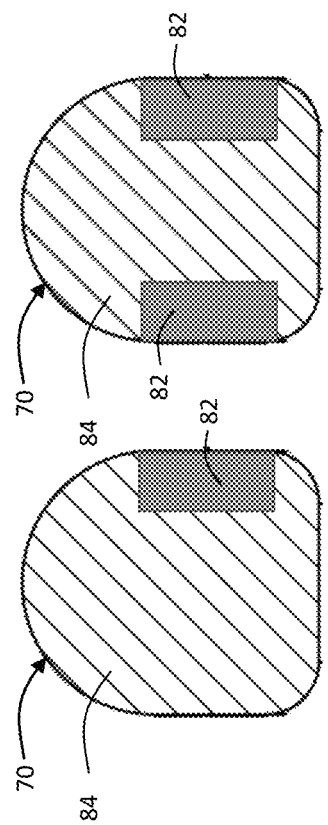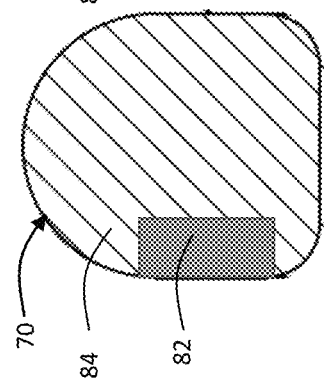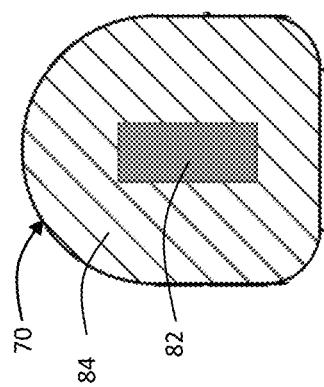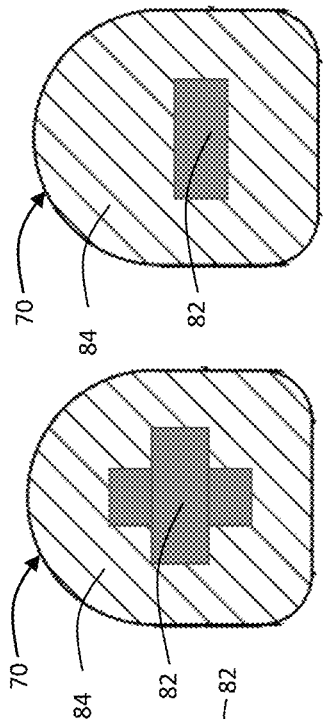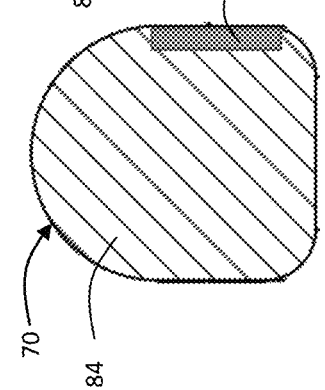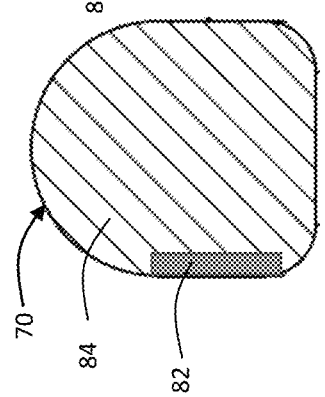

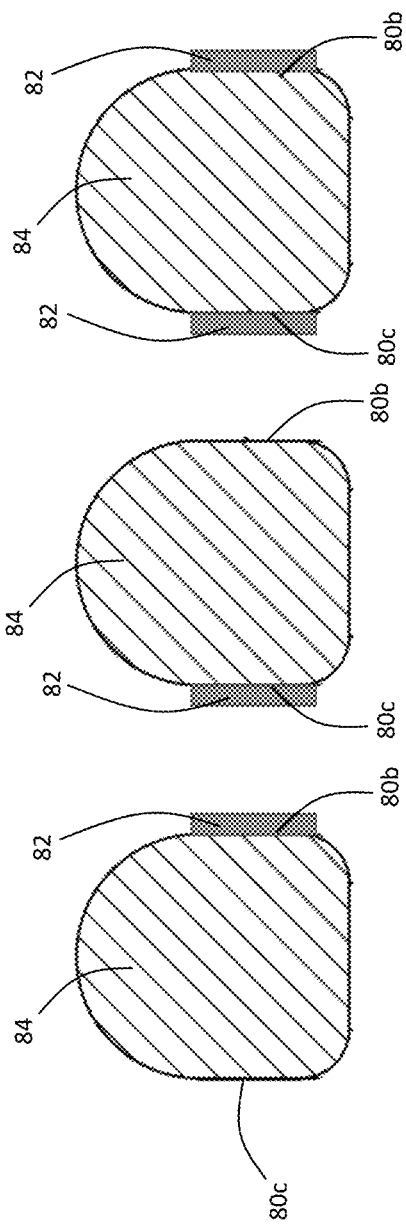

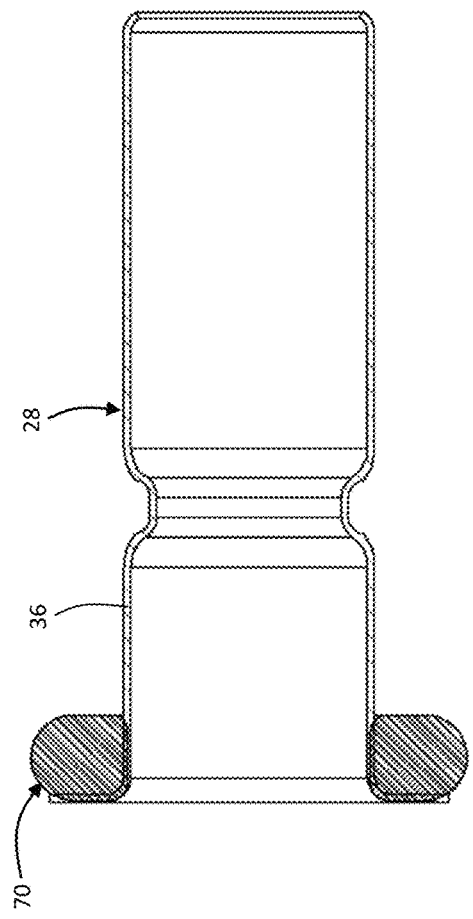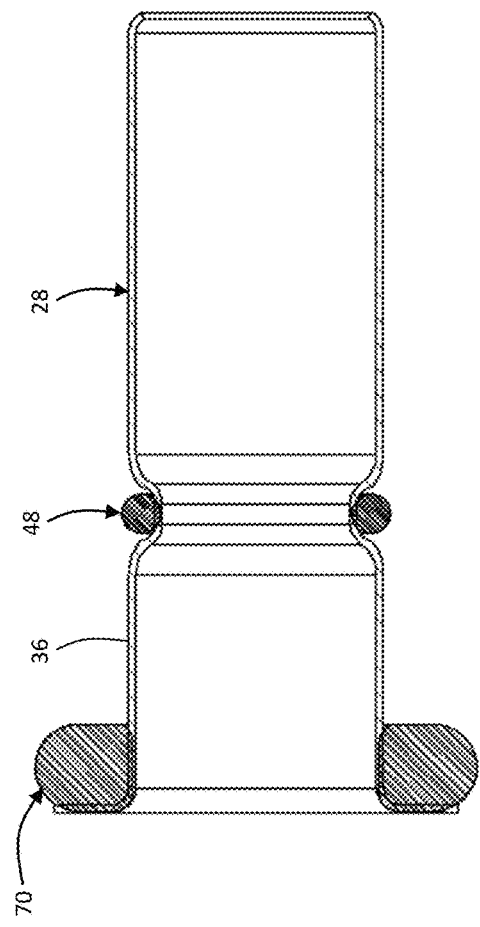

PIPE FITTING WITH INNER AND OUTER SEALS

TECHNICAL FIELD

The present application relates generally to pipe fittings. More specifically, the present application is related to stab-type pipe fittings.

BACKGROUND

Pipe fittings are used to connect sections of pipe. Stab-type fittings are a type of pipe fitting that is configured to be coupled to, for example inserted onto, an end of a pipe. One important aspect of pipe fittings is the ability to form an effective seal, for example an air tight seal, a water tight seal, or both an air and water tight seal.

Some pipe fittings include a seal member, for example an O-ring, which abuts an outer surface of the pipe and an inner surface of a portion of the pipe fitting. However, if the outer surface of the pipe is damaged, for example scratched, the seal member may not be capable of forming an effective seal with the section of the pipe.

Some pipe fittings include multiple seal members. Such a pipe fitting is described in International Publication No. 2004/063614, referred to herein as "WO 2004/063614." In WO 2004/063614 a primary O-ring simultaneously engages the outer surface of the section of pipe and the inner surface of the sleeve of the pipe fitting, and a secondary O-ring seals an outer surface of an insert of the pipe fitting against the inner surface of the sleeve.

After installation of a pipe fitting to the section of pipe as described in WO 2004/063614, loads applied to the section of pipe may result in bending of the pipe fitting, and the bending of the pipe fitting may result in a failure of the effective seal between the pipe fitting and the section of pipe.

Thus, a pipe fitting that is capable of forming an effective seal with a section of pipe, which may have external defects, and a pipe fitting that is further capable of maintaining the effective seal in the event of loads exerted on the section of pipe and the pipe fitting is desired.

SUMMARY

The present application discloses a shell-stiffener hub seal for a pipe fitting with inner and outer seals. Conventional seals for pipe fittings fail to maintain an effective seal when an outer surface of a pipe is scratched or otherwise damaged, and/or a bending load is applied to a section of the pipe. The shell-stiffener hub seal described herein increases an effective sealing area within the pipe fitting compared to conventional seals and includes a configuration that facilitates assembly.

In accordance with an aspect of the disclosure, the present application discloses a pipe fitting configured to be coupled to a pipe. The pipe fitting comprises a shell, a stiffener, and a shell-stiffener seal member. The shell defines a shell through hole that extends through the shell in the longitudinal direction. The shell has a shell inner surface that defines the shell through hole. The stiffener is positioned within the shell through hole and includes a stiffener outer surface that faces the shell inner surface such that the stiffener outer surface and the shell inner surface cooperate to define a pocket configured to receive the pipe. The shell-stiffener seal member is positioned in the pocket and includes a seal inner surface and a seal outer surface. The seal inner surface extends circumferentially about and longitudinally along the stiffener outer surface such that the seal inner surface is substantially flush against the stiffener outer surface forming a seal between the shell-stiffener seal member and the stiffener. The seal outer surface abuts against the shell inner surface forming a seal between the shell-stiffener seal member and the shell.

In accordance with an aspect of the disclosure, the present application discloses a shell-stiffener seal member for a pipe fitting configured to be coupled to a pipe. The pipe fitting includes a shell having an inner surface that defines a shell through hole and a stiffener positioned within the shell through hole. The pipe fitting defines a pocket between the inner surface of the shell and an outer surface of the stiffener. The shell-stiffener seal member comprises a body that includes a seal inner surface and a seal outer surface. The seal inner surface defines a substantially cylindrical shape and the seal outer surface is curved forming a body that has a cross section that is substantially D shaped. The seal inner surface is configured to lie substantially flush against the stiffener outer surface to form a seal between the shell-stiffener seal member and the stiffener. The seal outer surface is configured to abut against the shell inner surface to form a seal between the shell-stiffener seal member and the shell.

In accordance with an aspect of the disclosure, the present application discloses a method of assembling a pipe fitting configured to be coupled to a pipe. The method comprises the steps of: positioning the shell-stiffener seal member about an outer surface of a stiffener of the pipe fitting, the shell-stiffener seal member including a seal inner surface and a seal outer surface, the seal inner surface extending circumferentially about and longitudinally along the stiffener outer surface such that the seal inner surface is substantially flush against the stiffener outer surface forming a seal between the shell-stiffener seal member and the stiffener; and positioning the stiffener in a shell through bore defined by an inner surface of a shell of the pipe fitting such that the seal outer surface abuts against the shell inner surface forming a seal between the shell-stiffener seal member and the shell.

BRIEF DESCRIPTION OF THE DRAWINGS

The foregoing summary, as well as the following detailed description of illustrative embodiments of the application, will be better understood when read in conjunction with the appended drawings. For the purposes of illustrating the present disclosure, there is shown in the drawings illustrative embodiments. It should be understood, however, that the application is not limited to the specific embodiments and methods disclosed, and reference is made to the claims for that purpose. In the drawings:

FIG. 1 is a rear isometric view of a pipe fitting, according to an embodiment of the disclosure;

FIG. 2 is a front isometric view of the pipe fitting illustrated in FIG. 1;

FIG. 3 is a front isometric view of the pipe fitting illustrated in FIG. 1, the pipe fitting coupled to a section of a pipe;

FIG. 4 is a side cross-section view of the pipe fitting and coupled section of the pipe illustrated in FIG. 3, along line 4-4;

FIG. 5 is a side cross-section view of the pipe fitting illustrated in FIG. 4 with the shell removed;

FIGS. 11a-11c illustrate cross sections of alternative aspects of the shell-stiffener seal member shown in FIG. 6;

FIGS. 12a and 12b illustrate side views of alternative aspects of the stiffener;

DETAILED DESCRIPTION

Figure 8:
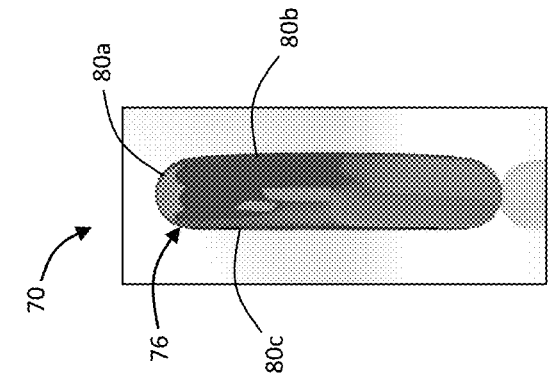
FIG. 8 illustrates a side view of the shell-stiffener seal member shown in FIG. 6.

Embodiments of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure. Reference herein to a first structure abutting a second structure refers to the first structure directly contacting the second structure, and precludes an intermediate structure or surface between the first structure and the second structure. The term "aligned" as used herein in reference to two elements in, along, or with respect to a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Certain features of the disclosure which are described herein in the context of separate embodiments may also be provided in combination in a single embodiment. Conversely, various features of the disclosure that are described in the context of a single embodiment may also be provided separately or in any subcombination.

Referring to FIGS. 1 to 4, a pipe 10 configured to transport a substance such as a liquid, a gas, or both through the pipe 10 includes a pipe body 12 and a pipe through bore 14 that extends through the pipe body 12. The pipe body 12 may extend along a pipe axis 16. As shown in the illustrated embodiment, the pipe axis 16 may be a central axis about which the pipe body 12 is centered. The pipe body 12 further includes a pipe outer surface 18 and a pipe inner surface 19. The pipe inner surface 19 defines the pipe through bore 14. In certain situations it may be beneficial to couple a pipe fitting 20 to the pipe 10. For example, it may be desirable to block off or cap an end of the pipe 10 such that the substance is prevented from exiting the pipe 10 and spilling into the surrounding environment. It may further be desirable to couple the pipe 10 to another pipe such that the substance is transported from the pipe 10 to the other pipe without spilling into the surrounding environment.

The pipe fitting 20 includes a body 22 that extends along a pipe fitting axis 24. As shown in the illustrated embodiment, the axis 24 may be a central axis about which the body 22 is centered. A radial or polar coordinate system is provided and described herein. The polar coordinate system includes a two dimensional radial plane that is centered on and normal to the axis 23. The polar coordinate system defines a longitudinal direction L that extends along a direction parallel to the axis 24. The polar coordinate system defines a radial direction R that extends from the axis 24 along the radial plane, such that the radial direction R is perpendicular to the longitudinal direction L. The words "inner" and "outer" designate locations closer to and farther away from the axis 24, respectively.

The body 22 includes a shell 26 and a stiffener 28 that is at least partially enclosed within a shell through hole 30 that is defined by the shell 26 such that the stiffener 28 is positioned closer to the axis 24 than the shell 26 is positioned to the axis 24 with respect to the radial direction R. The shell 26 includes a shell outer surface 32 that defines an outer perimeter of the body 22, and the shell further includes a shell inner surface 34 that defines the shell through hole 30. The shell 26 includes a shell first end 29 and a shell second end 31 that is spaced from the shell first end 29 along the longitudinal direction L. As shown in the illustrated embodiment, the shell 26 terminates along the longitudinal direction L at the shell first end 29 and the shell second end 31, and the shell through hole 30 extends through both the shell first end 29 and the shell second end 31.

The stiffener 28 includes a stiffener outer surface 36 that faces the shell inner surface 34, and the stiffener further includes a stiffener inner surface 38 that defines a stiffener through hole 40. The stiffener 28 includes a first end 42 and a second end 44 that is spaced from the first end 42 along the longitudinal direction L. As shown in the illustrated embodiment, the stiffener 28 terminates along the longitudinal direction L at the first end 42 and the second end 44, and the stiffener through hole 40 extends through both the first end 42 and the second end 44. The stiffener 28 further includes a stiffener recess 46 defined by the stiffener outer surface 36. The stiffener recess 46 is configured to receive a stiffener seal member 48, for example an O-ring. The pipe fitting 20 includes a pocket 47 positioned between and defined by the stiffener outer surface 36 and the shell inner surface 34.

The body 22 further includes a gripping assembly 50 configured to restrict, for example prevent, relative movement of the pipe 10 and the pipe fitting 20 along the longitudinal direction L once the pipe 10 and the pipe fitting 20 are coupled. The gripping assembly 50 may include a gripping collet 52, a gripping ring 60, or both positioned within the shell through hole 30 between the shell inner surface 34 and the stiffener outer surface 36 with respect to the radial direction R. The gripping collet 52 includes a tapered outer surface 54 and a toothed inner surface 56. The gripping ring 60 includes an outer surface 62 and a toothed inner surface 64, the toothed inner surface 64 including at least one tooth 66 configured to engage the pipe outer surface 18 when the pipe fitting 20 is coupled to the pipe 10.

According to one embodiment of the disclosure the gripping assembly 50 may further include a thrust washer 65 positioned between the shell seal member 68 and the gripping collet 52 to prevent movement of the shell seal member 68 into contact with movable or flexible portions of the gripping collet 52 which may result in damage to the shell seal member 68.

The body 22 further includes a shell seal member 68 and a shell-stiffener seal member 70. The shell seal member 68 may be positioned between the gripping collet 52 and the gripping ring 60 with respect to the longitudinal direction L. The shell seal member 68 is further positioned between the stiffener seal member 48 and the shell-stiffener seal member 70 with respect to the longitudinal direction L.

The shell-stiffener seal member 70 includes a seal inner surface 74 and a seal outer surface 76. The shell-stiffener seal member 70 is configured to be positioned about the stiffener 28 such that the seal inner surface 74 extends circumferentially about the stiffener outer surface 36, and the seal outer surface 76 abuts against the shell inner surface 34. The seal outer surface 76 may also abut against the first end 42 of the stiffener 28. In an aspect, the first end 42 of the stiffener 28 may include a flange that extends radially outward from the stiffener outer surface 36, and the seal outer surface 76 may abut against a surface of the flange.

FIG. 5 illustrates the pipe fitting 20 without the shell 26 positioned about the stiffener 28. The shell-stiffener seal member 70 is positioned about the stiffener 28 and is substantially "D shaped" in cross section (e.g. D-ring hub seal). The seal inner surface 74 is circumferential about the stiffener outer surface 36 and extends linearly along the longitudinal direction L. The seal outer surface 76 is curved. In an aspect, the seal outer surface 76 may curve from one end of the seal inner surface 74 to another end of the inner surface 74 forming a semi-circular arc in cross section.

Figure 7:
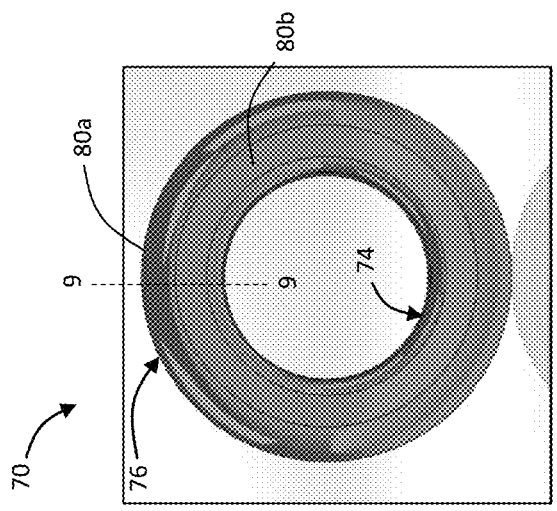
FIG. 7 illustrates a front view of the shell-stiffener seal member shown in FIG. 6.
Figure 6:
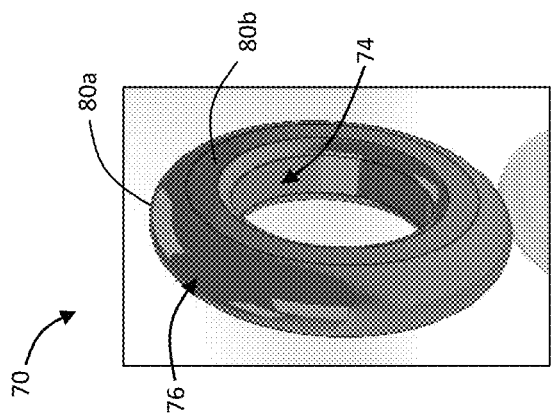
FIG. 6 illustrates a perspective view of a shell-stiffener seal member, according to another embodiment of the disclosure.

FIGS. 6-8 illustrate a perspective view, a front view, and a side view of the shell-stiffener seal member 70, according to aspects of this disclosure. The seal outer surface 76 may define a curved portion 80a and flat portions 80b and 80c. The flat portions 80b and 80c may extend radially outward from the seal inner surface 74 to the curved portion 80a.

Figure 9:
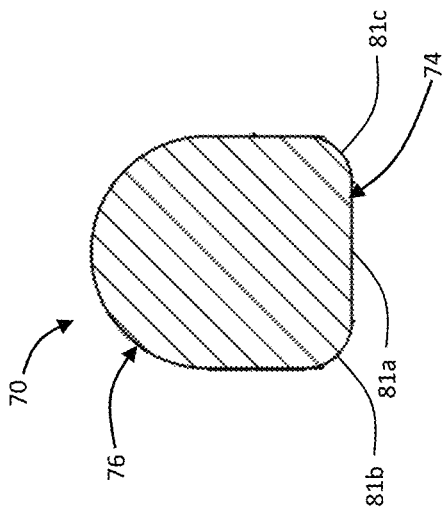
FIG. 9 illustrates a cross section of the shell-stiffener seal member shown in FIG. 6.

FIG. 9 illustrates a cross section of the shell-stiffener seal member 70 taken along line 9-9 shown in FIG. 7. The seal inner surface 74 may define a flat portion 81a and first and second curved corners 81b and 81c. The flat portion 81a may help keep the seal member 70 aligned on the stiffener 28 and can prevent waviness of the seal 70 that may compromise sealing. Each of the first and second curved corners 81b and 81c define a radius of curvature. The radius of curvature may depend upon a configuration of the stiffener 28. For example, the flange of the stiffener 28 may extend from the stiffener outer surface 36 with a radius of curvature, and the radius of curvature of the curved corner 81b and 81c positioned adjacent to the flange may have a radius of curvature that corresponds to the radius of curvature of the flange extending from the stiffener outer surface 36. In an aspect, the first and second curved corners 81b and 81c have substantially similar radius of curvatures.

Figure 10A:
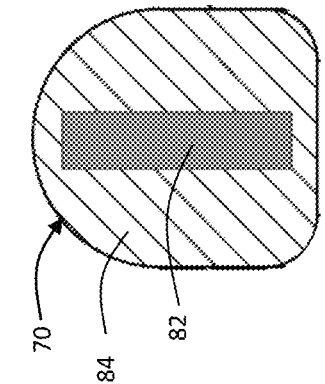
FIGS. 10a-10v illustrate cross sections of alternative aspects of the shell-stiffener seal member shown in FIG. 6.
Figure 10B:
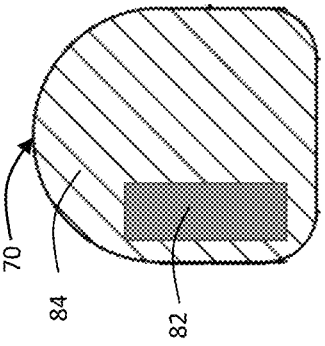
Figure 10C:
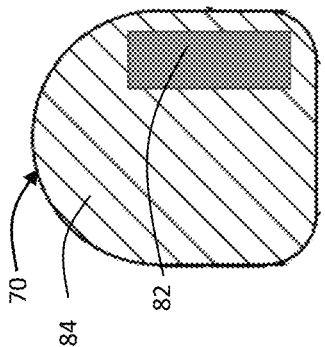
Figure 10D:
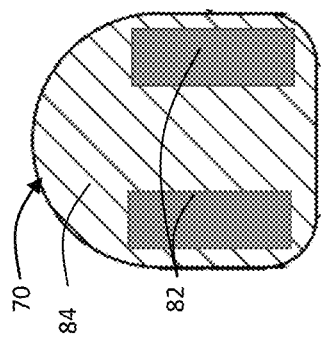
Figure 10E:
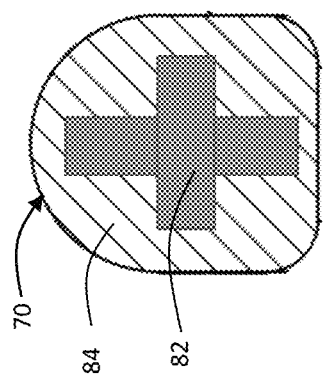
Figure 10F:
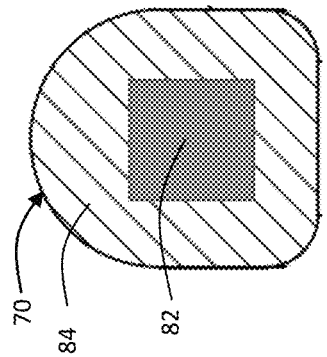
Figure 10G:
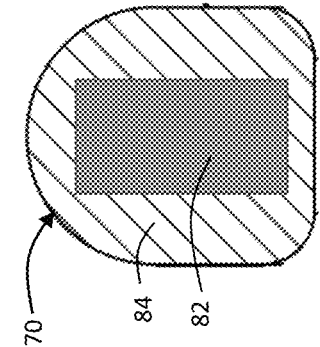
Figure 10H:
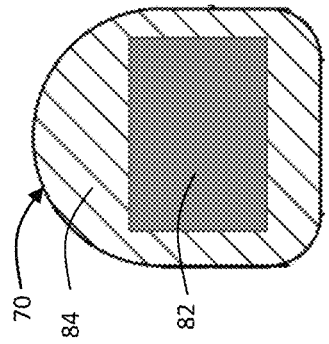
Figure 10Q:
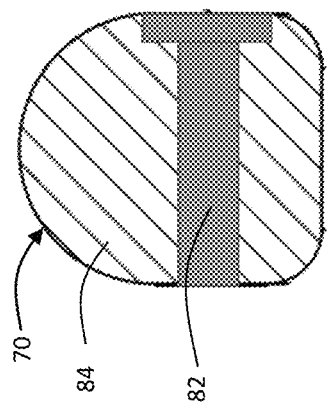
Figure 10T:
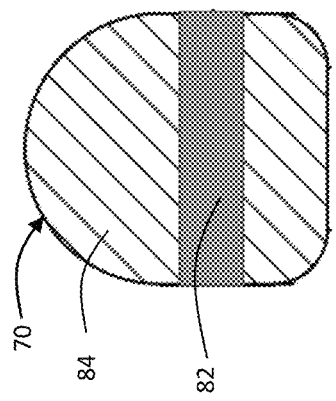
Figure 10R:
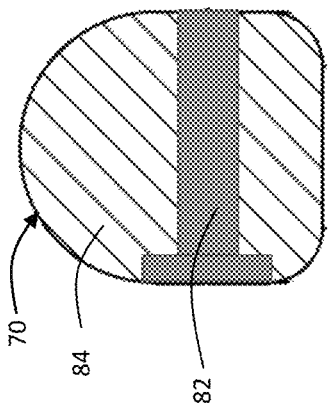
Figure 10U:
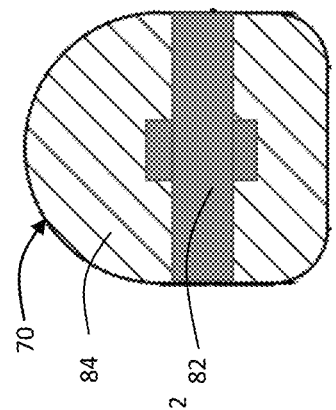
Figure 10S:
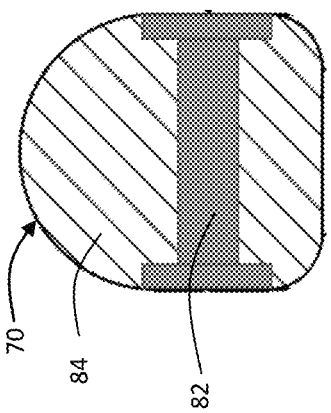
Figure 10V:
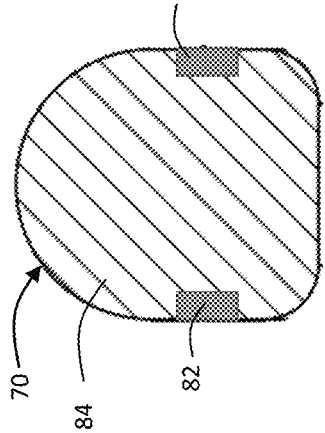

The shell-stiffener seal member 70 is formed of a single material that comprises a rubber. In an aspect, the rubber may comprise butyl rubber, nitrile rubber, a butyl nitrile compound, or another rubber suitable for forming a seal. The rubber may have a hardness of between approximately 40 durometer hardness and 90 durometer hardness, and more preferably between 45 durometer hardness and 55 durometer hardness. The stiffness of the shell-stiffener seal member 70 may be increased by including a metal substrate, plastic substrate, or other suitable material and overmolding the substrate with a rubber to form the D-ring hub seal. For example, FIGS. 10a-10v illustrate alternative aspects of the shell-stiffener seal member 70 comprising a substrate 82 (e.g. a metal and/or a plastic) with a rubber 84 overmolded to form a D shaped cross section. It will be appreciated that FIGS. 10a-10v are illustrative, and other configurations of the overmolded substrate 82 may be considered. It will be appreciated that the stiffness of the shell-stiffener seal member 70 may also be increased by including a metal substrate, plastic substrate, or other suitable material on an exterior of the D-ring hub seal. For example, FIGS. 11a-11c illustrate alternative aspects of the shell-stiffener seal member 70 comprising a substrate 82 (e.g. a metal and/or a plastic) adhered, glued, or otherwise attached to the seal outer surface 76 on either or both of the flat portions 80b and 80c.

The rubber exterior of the shell-stiffener seal member 70 enables the pipe fitting 20 to handle a bending load applied to the pipe 10 that may offset the axis of the stiffener 28 from the axis of the shell 26.

In an alternative aspect, the shell-stiffener seal member 70 could be directly overmolded onto the stiffener 28. For example, the shell-stiffener seal member 70 could be overmolded onto the stiffener outer surface 36 and onto the flange of the stiffener 28. FIG. 12a illustrates an example of the stiffener 28 with the shell-stiffener seal member 70 overmolded onto the stiffener outer surface 36. In another alternative aspect, the stiffener seal member 48 could be directly overmolded onto the stiffener 28. FIG. 12b illustrates an example of the stiffener 28 with the shell-stiffener seal member 70 and the stiffener seal member 48 overmolded onto the stiffener outer surface 36.

Referring again to FIGS. 1 to 4, the pipe fitting 20 defines an assembled configuration in which the shell-stiffener seal member 70 is positioned both between the first end 42 of the stiffener 28 and the gripping ring 60 with respect to the longitudinal direction L and in the pocket 47. In the assembled configuration, the shell-stiffener seal member 70 is compressed and forms a seal between the stiffener outer surface 36 and the shell inner surface 34, thereby forming a seal within the pocket 47 between the shell inner surface 34 and the stiffener outer surface 36.

The stiffener 28, according to one embodiment, may include a first portion 49 and a second portion 51, the second portion 51 spaced from the first portion 49 such that the stiffener recess 46 is between the first portion 49 and the second portion 51 with respect to the longitudinal direction L. The stiffener 28 may include a first outer diameter D1 defined by the stiffener outer surface 36 measured at a location 53 in the first portion 49 that is contacted by the seal member 70. The stiffener 28 may further include a second outer diameter D2 that is defined by the stiffener outer surface 36 measured at a location 55 in the second portion 51. As shown in the illustrated embodiment, the first outer diameter D1 may be equal to the second outer diameter D2.

As shown in the illustrated embodiment, the shell-stiffener seal member 70 is not confined within a channel that prevents movement of the shell-stiffener seal member 70 relative to the shell 26, the stiffener 28, or both along the longitudinal direction L. Thus, according to one aspect of the disclosure in the assembled configuration the shell-stiffener seal member 70 is translatable relative to the shell 26, the stiffener 28, or both along the longitudinal direction L. During manufacture of the pipe fitting 20, the shell-stiffener seal member 70 may be translated along the stiffener outer surface 36 until the seal member 70 abuts against the flange of the stiffener 28. In an aspect, the shell-stiffener seal member 70 is substantially symmetric such that the seal member 70 may be positioned on the stiffener 28 facing either direction.

The pipe fitting 20 is configured to be coupled to the pipe 10 to define a coupled configuration. In the coupled configuration the stiffener 28 is positioned within the pipe through bore 14 such that the stiffener seal member 48 is compressed between and forms a seal between the stiffener outer surface 36 and the pipe inner surface 19, a portion of the pipe 10 is positioned in the pocket 47 such that the shell seal member 68 is compressed between and forms a seal between the shell inner surface 34 and the pipe outer surface 18, and the shell-stiffener seal member 70 is compressed between and forms a seal between the shell inner surface 34 and the stiffener outer surface 36.

If the chamfered end 15 damages the shell-stiffener seal member 70, there might not be an adequate seal created between the shell 26 and the stiffener 28. If the chamfered end 15 deforms the shell-stiffener seal member 70, the pipe 10 may not be inserted to the correct depth. Inserting the pipe 10 to the correct depth within the pocket 47 may be important to form an effective seal. For example, the correct depth may be determined based on the location of scratches or defects on the pipe outer surface 18, and ensuring that the shell seal member 68 is not aligned with the scratches or defects. An installer of the pipe fitting 20 may mark the outer pipe surface 18 at a location that is aligned with the shell second end 31 when the pipe 10 is inserted within the pocket 47 to the correct depth. Thus, the shell-stiffener seal member 70 is positioned such that the chamfered end 15 abuts the seal member 70 without adversely damaging or moving the seal member 70, which results in a more efficient coupling process and a more effective seal for the pipe 10 and the pipe fitting 20.

The inclusion of the shell-stiffener seal member 70 removes the problem of damage, such as scratches, on the pipe outer surface 18 preventing an adequate seal being formed between the shell inner surface 34 and the pipe outer surface 18. The shell-stiffener seal member 70 forms a seal independent of the pipe 10, therefore rendering any damage to the pipe outer surface 18 moot to the formation of an adequate seal. Additionally, the configuration and position of the shell-stiffener seal member 70 may result in an effective seal between the shell 26 and the stiffener 28 that is more resilient and resistant to damage and leaks as a result of bending loads or other forces applied to the coupled pipe 10 than a seal member with multiple sealing members that require alignment.

Referring again to FIGS. 1 to 4, when the pipe 10 and the pipe fitting 20 are in the coupled configuration attempted withdrawal of the pipe 10 from the pocket 47 in the longitudinal direction L causes the teeth 66, which are directly abutting the pipe outer surface 18 to move the gripping assembly 50 in the longitudinal direction L, which results in the pipe 10 being more firmly gripped by the gripping collet 52 as described below.

As the gripping assembly 50 moves relative to the shell 26 in the longitudinal direction L, the tapered outer surface 54 of the gripping assembly abuts and is compressed radially toward the axis 24 by a tapered portion of the shell inner surface 34. The radial compression results in the gripping collet 52 exerting a gripping force on the pipe 10 thereby preventing further movement of the pipe 10 relative to the gripping assembly 50 in the longitudinal direction L.

Figure 13:
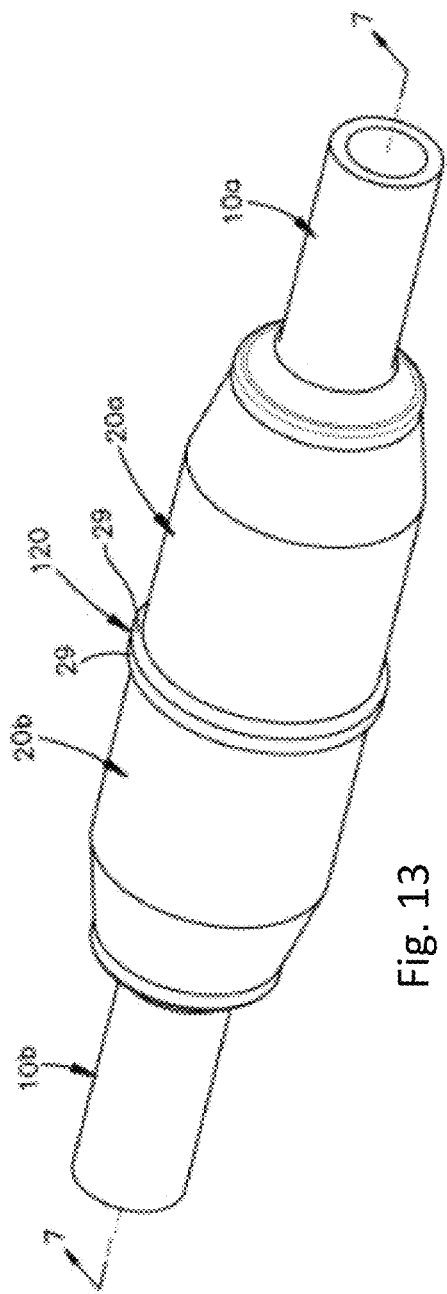
FIG. 13 is an isometric view of a pipe fitting, according to another embodiment of the disclosure.
Figure 14:
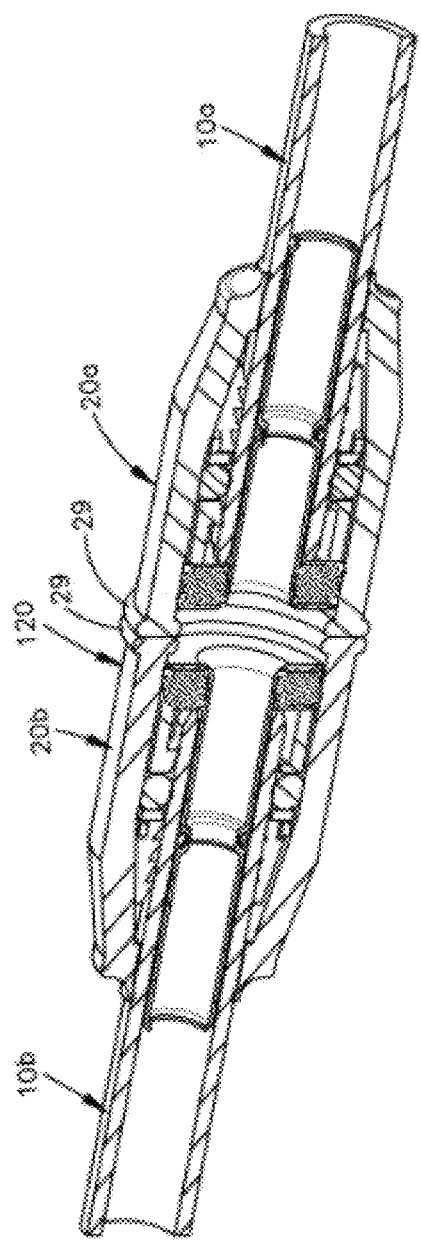
FIG. 14 is an isometric cross-section view of the pipe fitting illustrated in FIG. 13, along line 7-7.

The shell first end 29 may be configured to be coupled to a plurality of other members of fittings including but not limited to: a valve, a plug, and another pipe fitting. Referring to FIGS. 13 and 14, a pipe fitting 120 may include two identical ones of the pipe fitting 20 coupled to one another. As shown in the illustrated embodiment, the pipe fitting 120 includes a first pipe fitting 20a coupled to a second pipe fitting 20b, for example by connecting the shell first ends 29 of the first pipe fitting 20a and the second pipe fitting 20b. The description of the pipe fitting 20 herein is applicable to each of the first pipe fitting 20a and the second pipe fitting 20b. According to one embodiment, the first ends 29 may be connected by placing a hot member in contact with each of the first ends 29 until each of the first ends 29 begins to melt, then removing the hot member and forcing the first ends 29 into direct contact such that as the first ends 29 cool, the first ends solidify into a single piece thereby forming the pipe fitting 120.

The pipe fitting 120 is configured to couple a first pipe 10a to a second pipe 10b. As shown in the illustrated embodiment, the first pipe fitting 20a is coupled to the first pipe 10a to form a coupled configuration as described above, and the second pipe fitting 20b is coupled to the second pipe 10b to form a coupled configuration as described above. The resulting coupled configuration allows the substance to flow through the first pipe 10a, through the pipe fitting 120, and through the second pipe 10b without leaking any of the substance into the surrounding environment.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present disclosure.

We claim:

1. A pipe fitting configured to be coupled to a pipe, the pipe fitting comprising:
  a shell defining a shell through hole that extends through the shell in a longitudinal direction, the shell having a shell inner surface that defines the shell through hole;
  a stiffener positioned within the shell through hole, the stiffener including a stiffener outer surface that faces the shell inner surface such that the stiffener outer surface and the shell inner surface cooperate to define a pocket configured to receive the pipe; and
  a shell-stiffener seal member positioned in the pocket, the shell-stiffener seal member including a seal inner surface and a seal outer surface, the seal inner surface defining a flat portion and first and second curved corners, wherein the flat portion helps keep the shell-stiffener seal member aligned on the stiffener and prevent a movement of the shell-stiffener seal member, wherein each of the first and second curved corners define a radius of curvature the depends upon a configuration of the stiffener, the shell-stiffener seal member translatable relative to the shell, the stiffener, or both the shell and the stiffener along the longitudinal direction, the seal inner surface extending circumferentially about and longitudinally along the stiffener outer surface such that the seal inner surface is substantially flush against the stiffener outer surface forming a seal between the shell-stiffener seal member and the stiffener, the seal outer surface abutting against the shell inner surface forming a seal between the shell-stiffener seal member and the shell, wherein the stiffener extends in the longitudinal direction from a first end to a second end, wherein the first end includes a flange that extends radially outward from the stiffener outer surface, and wherein the seal outer surface abuts against the first end of the stiffener including the radially extended flange and wherein the shell-stiffener seal member is positioned such that a chamfered end of the pipe abuts the shell-stiffener seal member without damaging or moving the shell-stiffener seal member.

2. The pipe fitting of claim 1, wherein the shell-stiffener seal member comprises a rubber overmolded onto the flange.

3. The pipe fitting of claim 1, wherein a cross section of the shell-stiffener seal member comprises a D-ring hub seal that is substantially D shaped, wherein in a cross section the seal inner surface is substantially linear and the seal outer surface is curved from one end of the seal inner surface to another end of the seal inner surface forming a semi-circular arc in cross section.

4. The pipe fitting of claim 1, wherein the shell-stiffener seal member comprises a substrate that includes at least one of a metal or a plastic, the shell-stiffener seal member further comprising a rubber overmold on top of the substrate.

5. The pipe fitting of claim 4, wherein a hardness of the rubber is between approximately 40 durometer hardness and 90 durometer hardness.

6. The pipe fitting of claim 1, wherein the shell-stiffener seal member comprises a substrate that includes at least one of a metal or a plastic, the substrate being adhered to the seal outer surface of the shell-stiffener seal member.

7. The pipe fitting of claim 1, wherein the stiffener outer surface defines a stiffener recess that is configured to receive a stiffener seal member, the stiffener seal member is configured to compress and form a seal between an inner surface of the pipe and the stiffener outer surface when the pipe is positioned in the pocket.

8. The pipe fitting of claim 7, wherein the stiffener seal member comprises a rubber overmolded into the stiffener recess.

9. The pipe fitting of claim 7, wherein the stiffener includes a first portion and a second portion, the second portion spaced from the first portion such that the stiffener recess is between the first portion and the second portion with respect to the longitudinal direction, the stiffener has a first outer diameter defined by the stiffener outer surface measured at a location in the first portion that is contacted by the shell-stiffener seal member, the stiffener has a second outer diameter that is defined by the stiffener outer surface measured at a location in the second portion, and the first outer diameter is equal to the second outer diameter.

10. The pipe fitting of claim 9, further comprising a shell seal member configured to compress and form a seal between the shell inner surface and an outer surface of the pipe when the pipe is positioned in the pocket.

11. The pipe fitting of claim 10, wherein the shell seal member is positioned between the shell-stiffener seal member and the stiffener seal member with respect to the longitudinal direction.

12. The pipe fitting of claim 1, further comprising a gripping assembly configured to restrict relative movement of the pipe and the pipe fitting along the longitudinal direction when the pipe is positioned in the pocket and coupled to the pipe fitting.

13. A shell-stiffener seal member for a pipe fitting configured to be coupled to a pipe, the pipe fitting including a shell having an inner surface that defines a shell through hole, the pipe fitting defining a pocket between the inner surface of the shell and an outer surface of the stiffener, the shell-stiffener seal member comprising:
  a stiffener positioned with the shell through hole, wherein the shell-stiffener seal member is translatable relative to the shell, the stiffener, or both the shell and the stiffener along the longitudinal direction,
  a body including a seal inner surface and a seal outer surface, wherein the seal inner surface defines a substantially cylindrical shape and the seal outer surface is curved forming a body that has a cross section that is substantially D shaped,
  wherein the seal inner surface is configured to lie substantially flush against the outer surface of the stiffener to form a seal between the shell-stiffener seal member and the stiffener, the seal inner surface defining a flat portion and first and second curved corners, wherein the flat portion helps keep the shell-stiffener seal member aligned on the stiffener and prevent a movement of the shell-stiffener seal member, wherein each of the first and second curved corners define a radius of curvature the depends upon a configuration of the stiffener, wherein the seal outer surface is configured to abut against the shell inner surface to form a seal between the shell-stiffener seal member and the shell, and wherein the stiffener extends in a longitudinal direction from a first end to a second end, the first end includes a flange that extends radially outward from the outer surface of the stiffener, and wherein the seal outer surface abuts against the first end of the stiffener including the radially extended flange and wherein the shell-stiffener seal member is positioned such that a chamfered end of the pipe abuts the shell-stiffener seal member without damaging or moving the shell-stiffener seal member.

14. The shell-stiffener seal member of claim 13, wherein the shell-stiffener seal member comprises a substrate that includes at least one of: a metal or a plastic, the substrate being adhered to the seal outer surface of the shell-stiffener seal member.

15. The shell-stiffener seal member of claim 13, wherein the shell-stiffener seal member comprises a substrate that includes at least one of a metal or a plastic, the shell-stiffener seal member further comprising a rubber overmold on top of the substrate.

16. The shell-stiffener seal member of claim 15, wherein the rubber comprises a butyl nitrile compound.

17. The shell-stiffener seal member of claim 15, wherein a hardness of the rubber is between approximately 40 durometer hardness and 90 durometer hardness.

18. A method of assembling a pipe fitting configured to be coupled to a pipe, the method comprising the steps of:
  positioning a shell-stiffener seal member about an outer surface of a stiffener of the pipe fitting, the shell-stiffener seal member including a seal inner surface and a seal outer surface, the seal inner surface extending circumferentially about and longitudinally along the outer surface of the stiffener such that the seal inner surface is substantially flush against the outer surface of the stiffener forming a seal between the shell-stiffener seal member and the stiffener; and positioning the stiffener in a shell through bore defined by an inner surface of a shell of the pipe fitting such that the seal outer surface abuts against the shell inner surface forming a seal between the shell-stiffener seal member and the shell, the seal inner surface defining a flat portion and first and second curved corners, wherein the flat portion helps keep the shell-stiffener seal member aligned on the stiffener and prevent a movement of the shell-stiffener seal member, wherein each of the first and second curved corners define a radius of curvature the depends upon a configuration of the stiffener, wherein the shell-stiffener seal member is translatable relative to the shell, the stiffener, or both the shell and the stiffener along a longitudinal direction, wherein the stiffener extends in a longitudinal direction from a first end to a second end, the first end including a flange extending radially outward from the outer surface of the stiffener, and wherein the seal outer surface abuts against the first end of the stiffener including the radially extended flange and wherein the shell-stiffener seal member is positioned such that a chamfered end of the pipe abuts the shell-stiffener seal member without damaging or moving the shell-stiffener seal member.

19. The method of claim 18, wherein the outer surface of the stiffener defines a stiffener recess, the method further comprising:

positioning a stiffener seal member within the stiffener recess, the stiffener seal member being configured to form a seal between an inner surface of the pipe and the outer surface of the stiffener when the stiffener is positioned within the pipe.

20. The method of claim 18, further comprising the step of positioning a shell seal member within the shell, the shell seal member being configured to form a seal between the shell inner surface and an outer surface of the pipe when the pipe is positioned in the shell.

21. The method of claim 18, wherein a cross section of the shell-stiffener seal member comprises a D-ring hub seal that is substantially D shaped such that in cross section the seal inner surface is substantially linear and the seal outer surface is curved from one end of the seal inner surface to another end of the seal inner surface forming a semi-circular arc in cross section.

* * * * *